April 14, 1959
E. C. HASS
2,882,520
PHOTO-ELECTRIC SIGHTING DEVICE
Filed March 4, 1953
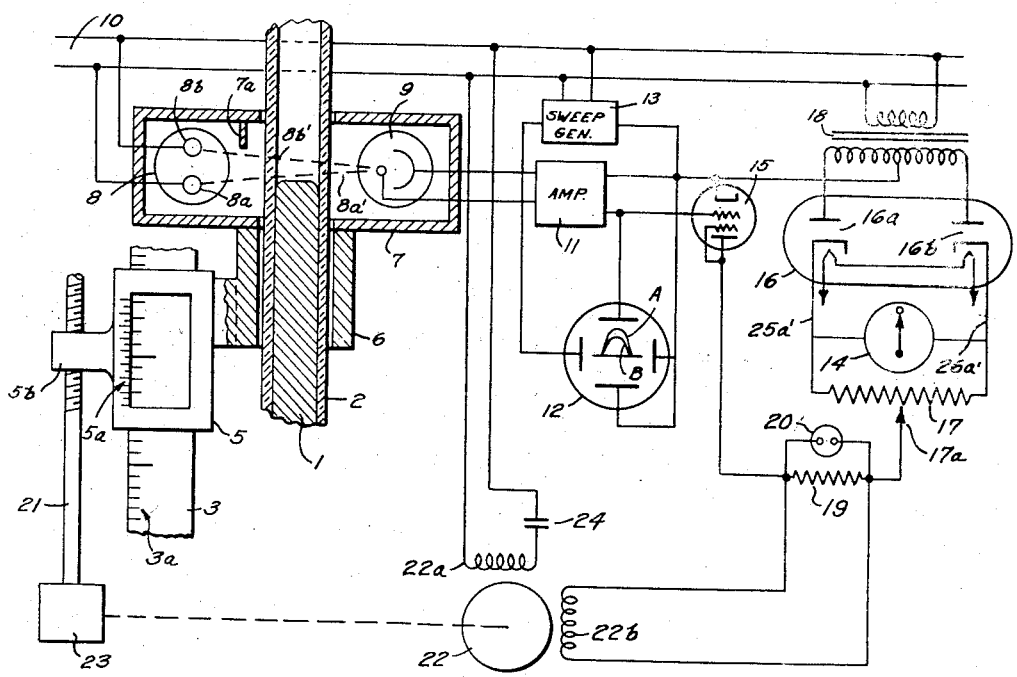
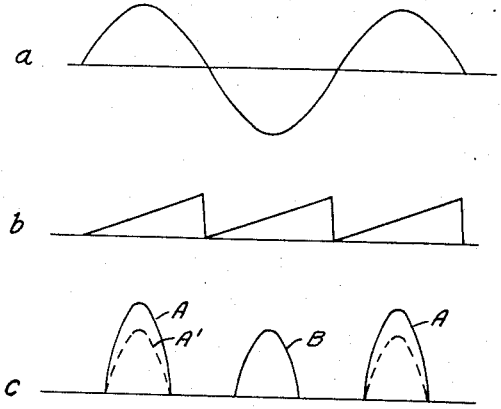
Fig.2.
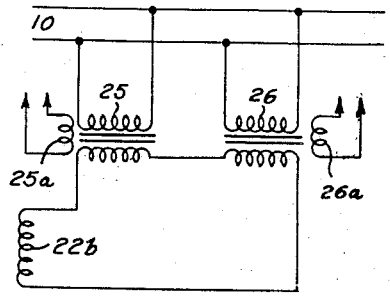
Fig.3.
INVENTOR
EDWARD C. HASS
BY Ralph B. Stewart
ATTORNEY United States Patent Office 2,882,520
Patented Apr. 14, 1959

2,882,520

PHOTO-ELECTRIC SIGHTING DEVICE

Edward C. Hass, Prince Georges County, Md.

Application March 4, 1953, Serial No. 340,360

12 Claims. (Cl. 340—190)

This invention relates to a sighting device which may be used for the accurate reading of the position of a movable element, such as the mercury column in barometers, manometers, thermometers, and other instruments.

My device is not limited in use on liquid columns but can be used to sight the position of other movable members whether liquid or solid.

An object of the invention is to devise a highly sensitive photo-electric sighting device for indicating both the direction and magnitude of the departure of the movable element with respect to the sighting axis of the device.

My invention is also useful as a control device for various purposes referred to hereinafter.

My invention involves the transmission of light rays across the path of movement of the movable element, the rays being projected upon a photo-electric cell arranged on the opposite side of the path, whereby the amount of light falling upon the cell is controlled by the movement of the element along its path of movement.

The cell is connected in an electric circuit and produces a current in the circuit which is varied from a maximum value to a minimum value as the element moves into the path of the light rays. A second electric current is established having a value between the maximum and minimum values of the photo-electric current, and the two currents are employed to control an indicator which produces a selective indication of the difference between said two currents, both in direction and magnitude.

In the preferred form of the invention, both currents are established by light-sensitive means controlled by light rays projected across the path of movement of the movable element at two closely spaced points. Thus, where the path of the movable element includes a transparent structure, such as a glass tube, any imperfections or irregularities in the tube will produce equal effects upon the two currents. While the two currents may be developed from separate cells connected in separate circuits, it is preferred to use a single photo-electric cell for establishing both currents, the cell being energized alternately from two different light sources located at points closely spaced along the length of the path of the movable element. The use of a single cell avoids the difficulty of variations between the two currents due to differences in cell characteristics where two cells are employed.

It is also preferred to employ only one amplifying channel for the production of both currents, thus avoiding differences due to different transmission characteristics of two separate channels.

The preferred form of my invention is illustrated diagrammatically in Figure 1 of the accompanying drawing, Figure 2 showing three wave forms for explaining the operation of the sighting device. Figure 3 is a circuit diagram showing a possible modification of Figure 1.

Referring to Figure 1, for the purpose of illustration only, my sighting device has been shown applied to the sighting of the end of a mercury column 1 within a glass tube 2, these parts being embodied in a pressure measuring device such as a barometer or a manometer. The tube 2 is mounted vertically parallel with a scale bar 3 carrying suitable scale graduations 3a. A slide 5 is mounted on the bar 3 for sliding along the length of the bar and carries an index in the form of a vernier scale 5a cooperating with the scale 3a on the bar 3. The slide 5 carries a ring 6 surrounding the tube 2 and forming a support for the housing 7 of the sighting device. On one side of the tube 2 within the housing 7 is provided two sources of light 8a and 8b spaced apart a short distance vertically or lengthwise of the tube 2. In the preferred form these light sources constitute the two electrodes 8a and 8b of a gaseous discharge lamp 8, such as a neon lamp. On the opposite side of the tube 2 within the housing 7 a photo-electric cell 9 is arranged to receive light rays from the two light sources 8a and 8b along two closely spaced paths represented by the dotted lines 8a' and 8b' respectively. These lines represent the axes of the two light beams acting on cell 9 from sources 8a and 8b.

In the preferred form of the invention, light sources 8a and 8b are energized periodically and alternately. This is accomplished by connecting the lamp 8 to an alternating current circuit 10, such as the usual sixty-cycle commercial circuit. It will be understood that on one pulsation the electrode 8a will glow, while the electrode 8b remains dark, and on the next pulsation of the alternating current cycle electrode 8b glows while electrode 8a remains dark. Obviously, other forms of light sources and other means for operating them alternately may be employed if desired.

Photo-electric cell 9 is connected to the input of a suitable electron tube amplifier 11. The alternate light pulses from sources 8a and 8b produce current pulses which are amplified by amplifier 11, and these amplified pulses are supplied to a suitable indicator for indicating the relative magnitude of the two series of pulses derived from the two spaced sources of light.

One suitable indicator may be an oscilloscope formed of a cathode-ray tube 12 having two sets of deflecting plates arranged at right-angles in the usual manner. The horizontal plates are supplied with saw-tooth waves from a sweep generator 13 which is controlled from circuit 10 to produce sweep waves of twice the frequency of circuit 10. The amplified output of amplifier 11 is supplied to the vertical plates of the oscilloscope 12.

Another form of a visual indicator has been shown in Figure 1, involving the use of a zero-centered meter 14 connected in a discriminator circuit controlled from amplifier 11 through an electron tube 15. The discriminator circuit involves a double diode electron tube 16, such as type 117Z6, having the two cathodes connected together through a resistance 17 and their two anodes supplied with alternating current voltages of opposite polarity through a transformer 18 energized from circuit 10. The mid-point of the secondary winding of transformer 18 is connected to the cathode of control tube 15, and the anode of tube 15 is connected to a sliding contact 17a on resistance 17 through a resistance 19. Thus, the tube 15 completes the return path for each of the diodes in tube 16 and the currents flowing through the two diodes are varied in accordance with the potential applied to the control grid of tube 15, which may be of the 6W6 type.

A current indicator, such as the neon lamp 20, may be connected across resistance 19.

The operation of the arrangement shown in Figure 1 is as follows:

The amount of light normally supplied to cell 9 from source 8b is reduced below the amount of light supplied from source 8a, and this may be accomplished by providing a suitable shield 7a in housing 7 to block some of the rays from source 8b. This could also be accomplished by forming electrode 8b of smaller size than electrode 8a.

The operation of the sighting device may be explained by reference to the wave forms shown in Figure 2. Figure 2a shows the wave form of the voltage supplied from the alternating current circuit 10. Figure 2b shows the sawtooth pulses generated by the sweep generator 13 and applied to the horizontal plates of oscilloscope 12; and Figure 2c shows the current pulses generated in the cell 9 by the light pulses from sources 8a and 8b.

It will be assumed that electrode 8a glows on each positive alternation of Figure 2a and electrode 8b glows on each negative alternation, only two positive and one negative alternations being shown in the drawing. The two positive alternations will produce in the cell 9 two pulses A, shown in Figure 2c, and the negative alternation will produce a smaller pulse B. These pulses are amplified at 11 and are reproduced at the vertical plates of oscilloscope 12. If the mercury column 1 does not cut off any of the rays from source 8a, the two series of pulses A and B will be shown on the screen of oscilloscope 12 in the form of traces A and B, B being smaller than A. The two traces are reproduced on the same time axis because sweep generator 13 has a frequency twice that of the circuit 10.

As the mercury column rises, or the sighting device is lowered, so that the column begins to block some of the rays from source 8a, the pulses A will be reduced in magnitude from their normal value, and continued cutting-off of the rays will finally reduce pulses A to the same amplitude as pulses B, as shown in dotted lines at A', Figure 2c. Under this condition, the two traces A and B on the oscilloscope 12 will coincide and appear as a single trace. Under this condition the sighting axis of the device coincides with the upper end of the column 1.

If the light from source 8a is further reduced by the column 1, the trace A will become of smaller amplitude than trace B, thus indicating a departure of the sighting axis from the level of the upper end of the column 1.

The discriminator circuit for controlling meter 14 effectively separates the A and B pulses into separate circuits, as follows:

On one alternation of circuit 10, space current is transmitted through one diode and through control tube 15, the amplitude of the space current being controlled in accordance with the value of the potential applied to the grid of this tube. For example, assume that diode 16a is conducting when pulse A is applied to tube 15, the current flowing in the left half of resistor 17 will be in proportion to the amplitude of pulse A. Also, diode 16b will conduct at the time pulse B is applied to the grid of tube 15 and the current flowing through the right half of resistance 17 and through the tube 15 will be in proportion to the amplitude of pulse B.

The moving part of meter 14 has sufficient inertia so that it does not respond to the individual current pulses impressed upon the meter from across resistance 17.

Pulses A and B tend to move the meter in opposite directions, and where the two pulses are of equal amplitude, there is no resulting force tending to deflect the meter. However, if the two series of pulses are of different amplitudes, the meter will be deflected from its zero-center in a direction depending upon which series of pulses is the greater, and the amount of deflection will vary with the amount of difference in amplitude between the two series of pulses. Thus, the meter 14 will be deflected in one direction in case the end of column 1 is below the sighting axis, and would be deflected in the other direction in case the end of the column rises above the sighting axis.

The meter 14 may be calibrated in distance units for indicating the amount and direction of departure of the end of the column 1 from the sighting axis of the sighting device. The device is quite sensitive to small departures. For example, the meter 14 can be calibrated so that a deflection of 0.5" corresponds to a departure of 0.008" (0.2 mm.), and by dividing this deflection into ten divisions, each division will represent a departure of 0.02 mm. Since deflections of considerably less than one-half of a division are easily readable, the sensitivity of the device is less than 4/10,000".

When the sighting axis of the sighting device coincides with the upper end of the column 1, the meter 14 is in zero position, and in order to distinguish between this condition and the inoperative condition of the circuit, the indicator lamp 20 is provided to show that the circuit is energized. Accordingly, zero indication on meter 14 at a time when lamp 20 is energized indicates that the sighting device is in proper sighting position, and a reading may then be taken from the scale 3a. Due to the fact that sighting is accomplished entirely by a photo-electric system, there will be no error due to parallax.

The sighting device may be employed to detect small variations in pressure causing movement of the mercury column. For this purpose the device is set on the proper sighting position to produce a zero reading on meter 14. The position of the device is noted, and the device is then moved a definite distance away from this position, for instance, it may be moved 0.2 mm. The gain of the amplifier is then set to obtain the desired meter deflection for the particular distance selected; for instance, the gain may be adjusted to produce a deflection of ten meter scale divisions as a result of the displacement of 0.2 mm. This process calibrates the meter in terms of pressure change, and the scale on the meter may be marked in terms of pressure. The sighting device or scanner is then returned to the null point, and thereafter any deflection of the meter either to the left or right will indicate a rise or fall in the pressure controlling the mercury column. The magnitude of the pressure will be proportional to the amount of needle deflection. With the adjustment indicated above, each scale division on the meter represents a change in pressure of 0.02 mm.

My sighting device or scanner may be employed as a controlling device for various purposes. For example, the scanner may control a motor arranged to move the slide 5 in a direction to maintain the scanner in proper reading position at all times and without the attention of an operator. For this purpose the slide is arranged to move vertically by suitable mechanical means represented by a lead screw 21 threaded through an arm 5b on the slide 5 and operated from a suitable electric motor 22 through suitable gearing 23. Preferably the motor 22 is a reversible two-phase motor of a known type having windings 22a and 22b. Winding 22a is supplied with current from circuit 10. Winding 22b is energized by current flowing through control tube 15 and may be connected across resistance 19, as shown, or it may replace resistance 19. With this arrangement, winding 22a is energized by alternating current of the form shown in Figure 2a and winding 22b is energized by pulsating current of the form shown in Figure 2c. A phase-shifting element, such as condenser 24, may be included in the circuit of winding 22a to secure proper phase relations between the currents in the two windings. Pulses A occur at times when the current in winding 22a is flowing in a positive direction and they tend to rotate the motor in one direction, while pulses B occur at a time when the current in winding 22a is flowing in the opposite direction and thus tend to rotate the motor in the opposite direction. The motor does not respond to the individual current pulses but only to the average effect of these pulses. Accordingly, if the two series of pulses are of equal amplitude, the motor will remain stationary, but if one series of pulses is of larger amplitude, the motor will rotate in a direction corresponding to the series of greater amplitude. The arrangement is such that the slide 5 will be driven in the direction of movement of the column 1 so that the scanner is maintained in the correct reading position at all times. This arrangement may be used to obtain a continuous record of the pressure acting on column 1 by arranging a recording pen to be moved by the movement of the scanner.

Instead of energizing winding 22b by pulsating current, this winding may be energized by alternating current displaced in phase with respect to the current in winding 22a. An arrangement for this purpose is shown in Figure 3. It involves two saturable transformers 25 and 26 energized from circuit 10 and having their secondary windings connected to motor winding 22b in series opposing relation. The saturating winding 25a of transformer 25 would be connected in the cathode lead of diode 16a at the point 25a', and the saturating winding 26a of transformer 26 would be connected in the cathode lead of diode 16b at the point 26a'. So long as the two series of pulses are of equal amplitude, the secondary voltages of transformers 25 and 26 will be equal and opposite, and no current will flow in winding 22b. As soon as one series of pulses has an amplitude greater than the other series, current of a definite phase relation will flow in motor winding 22b to operate the motor in a direction corresponding to the series of greater amplitude.

My sighting device may also be employed as a control device in an automatic regulator system to maintain a constant condition controlling the movement of the column 1. For example, by connecting the motor 22 to suitable control valves or other devices, the pressure acting on the column 1 may be changed or modified to maintain the column at any desired height.

It will be understood that the invention is not limited to use on pressure responsive devices, but may be employed in devices in which the movable element 1 is controlled in accordance with the variation of any variable condition. Also, the movable element need not be a mercury column, but it may be formed of other liquid. With a transparent liquid, it would be desirable to dye the liquid, preferably a green color to absorb the reddish light from the neon lamp. However, this is not necessary since the change in the index of refraction between an empty section of the tube and a section filled with transparent liquid is sufficient to vary the amount of light passing from the source 8a to the cell 9. Movable element 1 may assume the form of a solid rod actuated in accordance with a variable condition. It is also obvious that my sighting device is not limited to use of visible light, since by proper selection of the light sources and the photocell, it would be possible for the device to operate in complete darkness. Accordingly, the term "light" as used herein is not to be limited to visible wave energy but applies to radiant energy broadly whether visible or invisible.

Where the sighting device is applied to a barometer, automatic corrections for temperature and gravity variations may be obtained by the arrangement disclosed in my U.S. Patent No. 2,542,671. In this case the scanner housing 7 would be mounted upon the sighting ring 6 which is adjustably supported upon the slide 5 and is automatically shifted vertically with respect to the slide in accordance with the amount of correction to be applied.

In the practice of my invention it is not necessary that the light pulses transmitted along the two transverse paths 8a' and 8b' be of different magnitudes, and the shield 7a may be omitted so that the two sets of light pulses are equal or substantially equal. In this case, however, the sliding contact 17a on the resistor 17 would be shifted in a direction so that normally, with no blocking of the rays from either source, the amplitude of the current pulses supplied to meter 14 corresponding to the light pulses transmitted from the source 8b is smaller than the amplitude of the current pulses caused by source 8a. It is obvious also that the sighting axis of the device may be shifted along the mercury column to a limited extent by the shifting of the contact 17a.

I claim:

1. In a device for sighting the position of the top of a mercury column in a transparent tube, the combination of means located on one side of said tube for projecting light rays transversely through said tube in periodic pulses and alternately along two transverse paths through said tube and spaced apart a short distance along the length of the tube, means including a photo-electric cell located on the opposite side of said tube for receiving light pulses transmitted through said tube along both of said transverse paths and for generating electric pulses of amplitudes corresponding to said light pulses, an indicating meter, and a pulse discriminator for supplying to said meter in one direction the current pulses generated by the light pulses transmitted over one of said transverse paths and for supplying to the meter in the opposite direction the current pulses generated by the light pulses transmitted over the other transverse path.

2. In a device for sighting the position of the top of a mercury column in a transparent tube, the combination of means located on one side of said tube for projecting light rays transversely through said tube in periodic pulses and alternately along two transverse paths through said tube and spaced apart a short distance along the length of the tube, means including a photo-electric cell located on the opposite side of said tube for receiving light pulses transmitted through said tube along both of said transverse paths and for generating corresponding current pulses of proportional amplitude, a single amplifying channel for amplifying the current pulses induced in said tube by both sets of light pulses, an indicating meter, and a pulse discriminator connecting said meter to said amplifying chanel for supplying one set of amplified current pulses to the meter for operation thereof in one direction and supplying the other set of amplified current pulses for operation of the meter in the opposite direction.

3. In a device for sighting the position of an element movable along a given path, the combination of means to project a first series of periodic pulses of light rays across said given path and along a first transverse path, an electric circuit including a photo-electric cell arranged on the opposite side of said given path for establishing in said circuit a series of current pulses of an amplitude proportional to the light pulses reaching said cell along said first transverse path, means to project a second series of pulses of light onto said cell along a second transverse path crossing said given path at a point spaced from but closely adjacent to said first transverse path and thereby to produce a second series of current pulses in said circuit, the light pulses of said second series being projected alternately with the pulses of said first series, said element being operative upon movement thereof along said given path to vary the amplitude of said first series of current pulses from a maximum value to a minimum value, said second series of current pulses having a maximum amplitude between said maximum and said minimum values, and an indicator controlled by said two series of current pulses and producing a selective indication of the difference between the amplitudes of said two series of current pulses, both in direction and magnitude.

4. A device according to claim 3 wherein said indicator comprises a cathode ray tube having two sets of deflecting elements arranged at right-angles to each other, means for supplying to one set of deflecting elements sweep pulses of a frequency twice the frequency of light pulses in either series, and means for supplying said two series of current pulses to the other set of deflecting elements.

5. In a device for sighting the position of an element movable along a given path, the combination of means to project a first series of periodic pulses of light rays across said given path and along a first transverse path, an electric circuit including a photo-electric cell arranged on the opposite side of said given path for establishing in said circuit a series of current pulses of an amplitude proportional to the light pulses reaching said cell along said first transverse path, means to project a second series of pulses of light onto said cell along a second transverse path crossing said given path at a point spaced from but closely adjacent to said first transverse path, the light pulses of said second series being projected alternately with the pulses of said first series, said element being operative upon movement thereof along said given path to vary the amplitude of said first series of current pulses from a maximum value to a minimum value, said second series of current pulses having a maximum amplitude between said maximum and said minimum values, means for separating said two series of pulses into separate circuits, an indicating meter, and means connecting said separate circuits to said meter in differential relation.

6. In a device for sighting the position of an element movable along a given path, the combination of means to project light rays across said path, light-sensitive means for establishing a current proportional to the light transmitted across said path at a first point, means for establishing a second current proportional to light transmitted across said path at a second point spaced along said path a short distance from said first point, said element being operative, upon movement thereof along said path, to vary said first current from a maximum value to a minimum value, said second current having a maximum value between said maximum and said minimum values, and an indicator controlled by said two currents acting in opposition to each other and producing a selective indication of the difference between said two currents, both in direction and magnitude.

7. In a device for sighting the position of the top of a mercury column in a transparent tube, the combination of means to project light rays transversely through said tube, an electric circuit including light-sensitive means for establishing in said circuit a current proportional to the light transmitted through said tube at a first point along the length of the tube, means for establishing a second current proportional to light transmitted through said tube at a second point spaced along the length of the tube a short distance from said first point, said element being operative, upon movement thereof along said path, to vary said first current from a maximum value to a minimum value, said second current having a maximum value between said maximum and said minimum values, and an indicator controlled by said two currents acting in opposition to each other and producing a selective indication of the difference between said two currents, both in direction and magnitude.

8. A device according to claim 7 wherein said indicator comprises an electric motor driven in one direction when said first current exceeds said second current and driven in the opposite direction when said first current is less than said second current.

9. In a device for sighting the position of an element movable along a given path, the combination of means to project a first series of periodic pulses of radiant energy across said given path and along a first transverse path, means arranged on the opposite side of said given path for establishing a series of current pulses of an amplitude proportional to the radiant energy pulses transmitted across said given path along said first transverse path, means to project a second series of pulses of radiant energy along a second transverse path crossing said given path at a point adjacent said first transverse path, the pulses of said second series being projected alternately with the pulses of said first series, means controlled by the radiant energy pulses transmitted along said second transverse path for producing current pulses proportional to the radiant energy pulses received along said second transverse path, said element being operative upon movement thereof along said given path to vary the amplitude of said first series of radiant energy pulses from a maximum value and thereby to correspondingly vary the amplitude of said first series of current pulses to a minimum value, and an indicator controlled by said two series of current pulses and producing a selective indication of the difference between the amplitudes of said two series of current pulses, both in direction and magnitude.

10. In a device for sighting the position of the top of a mercury column in a transparent tube, the combination of a slide mounted to move along the length of said tube and having portions lying on opposite sides of said tube, a gas-filled glow lamp mounted on said slide and having two closely spaced electrodes spaced apart along the length of said tube, a photoelectric cell mounted on said slide on the opposite side of said tube and being positioned to receive light from both of said electrodes transmitted along closely spaced paths extending transversely through said tube, means for supplying alternating-current voltage to the electrodes of said glow lamp whereby said electrodes are caused to glow periodically and alternately, and whereby said photoelectric cell produces two series of electric pulses of amplitudes corresponding to the light pulses transmitted through said tube along said transverse paths respectively, an indicator having two energizing circuits operating in opposition to each other, and a pulse discriminator for supplying to one of said energizing circuits the current pulses generated by the light pulses transmitted over one of said transverse paths and for supplying to the other energizing circuit current pulses generated by the light pulse transmitted over the other transverse path.

11. In a device for sighting the position of an element movable along a given path of movement, the combination of a gas-filled glow lamp mounted alongside of said path and having two closely spaced electrodes spaced apart along the length of said path, a photoelectric cell mounted on the opposite side of said path and being positioned to receive light from both of said electrodes transmitted along closely spaced paths extending transversely across the path of movement of said member, means for supplying alternating-current voltage to the electrodes of said glow lamp whereby said electrodes are caused to glow periodically and alternately, and whereby said photoelectric cell produces two series of electric pulses of amplitudes corresponding to the light pulses transmitted along said transverse paths respectively, an indicator having two energizing circuits operating in opposition to each other, and a pulse discriminator for supplying to one of said energizing circuits the current pulses generated by the light pulses transmitted over one of said transverse paths and for supplying to the other energizing circuit current pulses generated by the light pulse transmitted over the other transverse path.

12. In a device for sighting the position of an element movable along a given path of movement, the combination of a gas-filled glow lamp mounted alongside of said path and having two closely spaced electrodes spaced apart along the length of said path, a photoelectric cell mounted on the opposite side of said path and being positioned to receive light from both of said electrodes transmitted along closely spaced paths extending transversely across the path of movement of said member, means for supplying alternating-current voltage to the electrodes of said glow lamp whereby said electrodes are caused to glow periodically and alternately, and whereby said photoelectric cell produces two series of electric pulses of amplitudes corresponding to the light pulses transmitted along said transverse paths respectively, an amplifier controlled by said photoelectric cell and amplifying both series of current pulses, and a pulse discriminator connected to the output of said amplifier and separating the two series of amplified pulses into separate circuits.

References Cited in the file of this patent

UNITED STATES PATENTS

| | | |
|---|---|---|
| 1,955,315 | Styer | Apr. 17, 1934 |
| 1,970,103 | Runaldue | Aug. 14, 1934 |
| 1,999,646 | Wittkuhns | Apr. 30, 1935 |
| 2,066,934 | Gulliksen | Jan. 5, 1937 |
| 2,091,303 | Brelsford | Aug. 31, 1937 |
| 2,193,606 | Ulrey | Mar. 12, 1940 |
| 2,241,743 | Schoene | May 13, 1941 |
| 2,252,727 | Pepper | Aug. 19, 1941 |
| 2,455,243 | Epprecht | Nov. 30, 1948 |
| 2,490,627 | Hofberg | Dec. 6, 1949 |
| 2,548,755 | Vossberg | Apr. 10, 1951 |
| 2,555,674 | Carrick | June 5, 1951 |
| 2,604,528 | Obermaier | July 22, 1952 |

UNITED STATES PATENT OFFICE
CERTIFICATE OF CORRECTION

Patent No. 2,882,520                                               April 14, 1959

Edward C. Hass

It is hereby certified that error appears in the printed specification of the above numbered patent requiring correction and that the said Letters Patent should read as corrected below.

Column 7, line 75, beginning with the words "and thereby" strike out all to and including "current pulses" in column 8, line 1, and insert the same in column 8, line 2, after "value" and before the comma.

Signed and sealed this 1st day of September 1959.

(SEAL)
Attest:

KARL H. AXLINE                                                                     ROBERT C. WATSON
Attesting Officer                                                         Commissioner of Patents